Jan. 27, 1970 N. E. G. KAISER 3,492,442
MEANS FOR ADVANCING A MAGNETIC TAPE AND FOR MAGNETIC TAPE RECORDING AND PLAYBACK
Filed Aug. 26, 1966
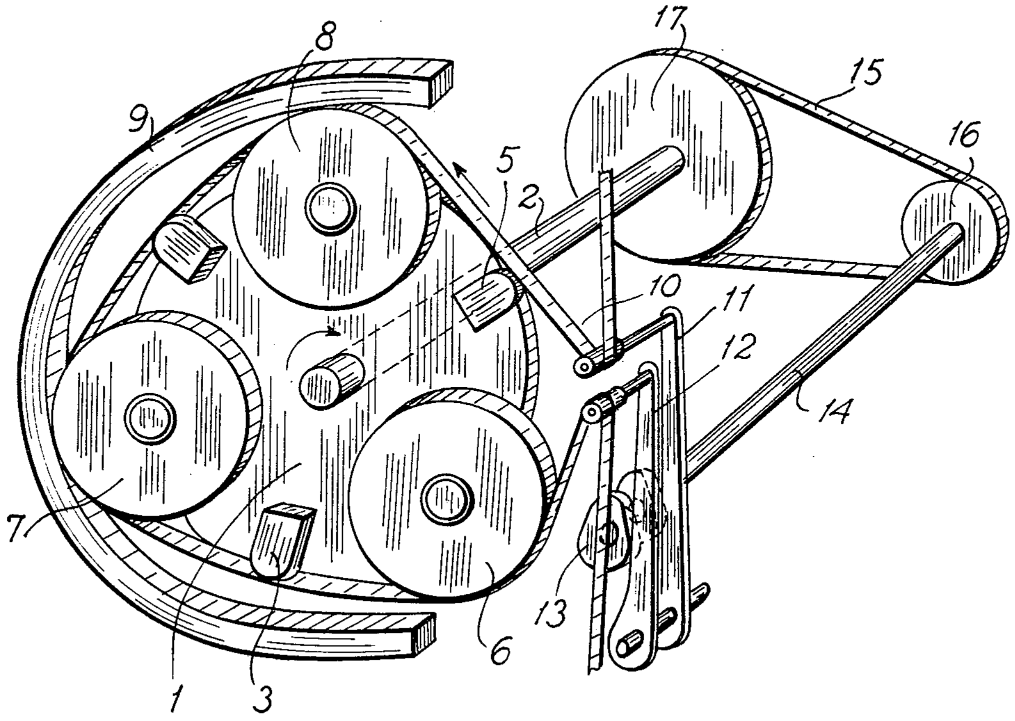
INVENTOR
NIELS EDMUND GULDBAEK KAISER
BY Cushman, Darby & Cushman
ATTORNEYS

United States Patent Office 3,492,442

Patented Jan. 27, 1970

3,492,442

MEANS FOR ADVANCING A MAGNETIC TAPE AND FOR MAGNETIC TAPE RECORDING AND PLAYBACK

Niels Edmund Guldbaek Kaiser, Linde Alle 36, Copenhagen, Vanlose, Denmark

Filed Aug. 26, 1966, Ser. No. 575,469
Claims priority, application Denmark, Aug. 27, 1965, 4,395/65
Int. Cl. G11b *5/00*
U.S. Cl. 179—100.2 11 Claims

ABSTRACT OF THE DISCLOSURE

Apparatus having a plurality of rollers mounted on a rotatable member whose axis is coincident with the axis of an arcuate member. A tape is driven by engagement between the rollers and the inner periphery of the arcuate member in such a manner that a section of the tape may be scanned a plurality of times by a plurality of heads mounted on the rotatable member.

The present invention relates to means for advancing a magnetic tape and for magnetic tape recording and playback with repeated passage of the magnetic heads of the device over the identical tape section at a single advancement.

The said means is particularly applicable when analysing encephalograms. The magnetic tape generally contains a number of recorded tracks, each representing an encephalogrammic curve. To obtain a frequency analysis of these curves, they are subjected to a playback at great velocity in order to raise the frequency and consequently to facilitate the analysis since electric filters are more readily obtained for a frequency range of high frequencies. By the use of this invention it is furthermore possible to play back the identical tape section several times during a single advancement, which further increases the reliability of the result of the analysis. Owing to the repeated playback it is also possible on a single advancement of the tape to perform up to several analyses at a time, i.e. with a view to determine whether the curves recorded show interdependent relationship.

An object of the invention is thus to provide means for magnetic tape advancement. Another object of the invention is to provide means for analysing encephalogrammic curves, recorded on magnetic tape.

An essential feature of the means according to the invention is that it is comprised of a member of circular arc shape with a plurality of rollers which run on the inner periphery of the said member and are rotatably attached to a rotatable body having its center of rotation coincident with the center of the circular arc member the said body being furthermore provided with several magnetic heads for contacting the magnetic tape.

Between the rollers and the circular arc shaped member the magnetic tape is moved from roller to roller.

When the aforesaid body is turned, the magnetic tape is advanced at an average velocity determined as $\omega(d-1)$, in which $\omega$ is the cyclic frequency of the body, $d$ the diameter of the inner circle of the circular arc shaped member and 1 the length of an imaginary endless tape passed over all the rollers. The playback speed will be equal to $\omega$D.

An essential feature of a preferred embodiment of the invention is that both when entering and leaving the rollers the tape is passed over at least one tightening roller with a rocking movement timed to the movement of the rotating body.

The result obtained is a compensation for the varying rate of advancement caused by the tape advancing means.

The invention will now be described in detail on the basis of an embodiment shown by way of example as a diagrammatic representation in the drawing.

A rotating disc 1 is mounted on a spindle 2 which is driven by a constant speed motor (not shown). The disc 1 carries in the example illustrated three magnetic heads 3, 4 and 5 spaced on the disc at an angular distance of 120° apart, measured from the center of the disc and so arranged as to get into contact with a magnetic tape 10. Between the magnetic heads are rollers 6, 7 and 8. likewise mounted on the disc and spaced at an equal angular distance apart, measured from the center of the disc. At least two of the rollers will always be on the inner side of a member 9 of circular arc shape and in contact with the magnetic tape 10 running between the said rollers and the said member. When the circle is rotating in a clockwise direction, the magnetic tape running between the rollers will move at an average speed along the inner side of the circular arc member in the direction opposite to the direction of movement of the rollers. The said speed is several times less than the playback speed. The identical tape section will therefore be passed many times by the magnetic heads while it is passing through the device.

The points of the magnetic tape which are in contact with the roller path have locally a zero velocity. Since the points of contact are displaced during the rotation of the disc, the tape running in and out will be subjected to periodic variations in velocity.

These variations in velocity may be compensated for by passing the magnetic tape over a pair of pulleys mounted on corresponding rocker arms 11 and 12. The said rocker arms are controlled by cam discs 13 mounted on a rotatable spindle 14 which is rotated at a speed three times as great as that of the spindle 2 by means of a belt 15 and gearwheels 16 and 17.

What I claim and desire to secure by Letters Patent is:

1. Means for advancing magnetic tape and for magnetic tape recording and playback with repeated passage of magnetic heads of said means over the identical tape section at a single advancement, comprising:
- a member of circular arc shape;
- a rotatable body having a center of rotation coincident with the center axis of said circular arc member;
- a plurality of rollers rotatably mounted with respect to said rotatable body for running on the inner periphery of said arc-shaped member;
- said arc-shaped member and said plurality of rollers being operatively associated to receive said tape therebetween; and
- a plurality of magnetic heads affixed to said rotatable body for contacting said magnetic tape.

2. Means for advancing magnetic tape is claimed in claim 1 further including:
- at least one tightening roller mounted with respect to said rollers to enable the passing of said tape over said tightening roller with a rocking movement timed to the movement of said rotatable body both when said tape is entering and leaving said rollers.

3. Apparatus for advancing magnetic tape, comprising:
- a generally arc-shaped member;
- a rotatable body operatively associated with said member for rotation with respect to said member;
- a plurality of rollers rotatably mounted with respect to said rotatable body for movement with respect to said arc-shaped member;
- said arc-shaped member and said rollers being operatively associated to receive said tape therebetween; and
- at least one magnetic head operatively associated with said rotatable body for contacting said magnetic tape.

4. Apparatus as in claim 3 wherein said magnetic head repeatedly passes at least one identical section of said tape at a single advancement of said tape.

5. Apparatus as in claim 3 further including:

at least one tightening roller mounted with respect to said rollers to enable the passing of said tape over said tightening roller with a rocking movement timed to the movement of said rotatable body when said tape is entering and leaving said rollers.

6. Apparatus for advancing a web and for enabling the repeated passage of a work station of said apparatus over the identical web section at a single advancement, comprising:

a generally arc-shaped member;

a rotatable body having a center of rotation coincident with the center axis of said arc-shaped member;

a plurality of rollers rotatably mounted with respect to said rotatable body for running on the inner periphery of said arc-shaped member;

said arc-shaped member and said plurality of rollers being operatively associated to receive said web therebetween; and a plurality of work stations affixed to said rotatable body for contacting said web.

7. Apparatus as in claim 6 further including:

at least one tightening roller mounted with respect to said rollers to enable the passing of said web over said tightening rollers with a rocking movement timed to the movement of said rotatable body both when said web is entering and leaving said rollers.

8. Apparatus for advancing a web wherein said web enters and exits said apparatus, comprising:

a generally arc-shaped member;

a rotatable body operatively associated with said member for rotation with respect to said member;

a plurality of rollers rotatably mounted with respect to said rotatable body for movement with respect to said arc-shaped member;

said arc-shaped member and said rollers being operatively associated to receive said web therebetween; and at least one work station operatively associated with said rotatable body for contacting said web.

9. Apparatus as in claim 8 wherein said arc-shaped member subtends an arc of less than 360°.

10. Apparatus as in claim 8 wherein said work station repeatedly passes at least one identical section of said web at a single advancement of said web.

11. Apparatus as in claim 8 further including:

at least one tightening roller mounted with respect to said rollers to enable the passing of said web over said tightening rollers with a rocking movement timed to the movement of said rotatable body both when said web is entering and leaving said rollers.

References Cited

UNITED STATES PATENTS

| | | | |
|---|---|---|---|
| 2,886,650 | 5/1959 | Fairbanks et al. ---- | 179—100.2 |
| 2,909,616 | 10/1959 | Marty ------------ | 179—100.2 |
| 3,374,372 | 3/1968 | Tinder et al. --------- | 74—640 |

BERNARD KONICK, Primary Examiner

J. RUSSELL GOUDEAU, Assistant Examiner

U.S. Cl. X.R.

74—216.5, 640